(12) United States Patent
Shikha

(10) Patent No.: US 8,756,215 B2
(45) Date of Patent: Jun. 17, 2014

(54) INDEXING DOCUMENTS

(75) Inventor: Deep Shikha, Haryana (IN)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 12/629,465

(22) Filed: Dec. 2, 2009

(65) Prior Publication Data

US 2011/0131212 A1    Jun. 2, 2011

(51) Int. Cl.
    *G06F 7/00*      (2006.01)
    *G06F 17/30*      (2006.01)

(52) U.S. Cl.
    USPC ............................ 707/711; 707/739; 704/8

(58) Field of Classification Search
    None
    See application file for complete search history.

(56) References Cited

U.S. PATENT DOCUMENTS

| | | | | |
|---|---|---|---|---|
| 5,148,541 A | * | 9/1992 | Lee et al. ........................ 1/1 |
| 5,412,712 A | * | 5/1995 | Jennings ................. 379/88.05 |
| 5,752,051 A | * | 5/1998 | Cohen ............................ 704/1 |
| 6,006,221 A | * | 12/1999 | Liddy et al. ...................... 1/1 |
| 6,047,251 A | * | 4/2000 | Pon et al. ....................... 704/1 |
| 6,064,951 A | * | 5/2000 | Park et al. ...................... 704/8 |
| 6,389,387 B1 | * | 5/2002 | Poznanski et al. ............. 704/9 |
| 6,615,168 B1 | * | 9/2003 | Resnik et al. .................. 704/8 |
| 7,359,851 B2 | | 4/2008 | Tong et al. |
| 7,369,987 B2 | | 5/2008 | Loofbourrow et al. |
| 7,437,284 B1 | * | 10/2008 | Margulies ...................... 704/7 |
| 8,135,580 B1 | * | 3/2012 | Jin et al. ......................... 704/9 |
| 8,380,488 B1 | * | 2/2013 | Liu et al. ........................ 704/4 |
| 8,464,150 B2 | * | 6/2013 | Davidson et al. ........... 715/264 |
| 2001/0013047 A1 | * | 8/2001 | Marques ..................... 707/536 |
| 2002/0111792 A1 | * | 8/2002 | Cherny .......................... 704/8 |
| 2003/0149686 A1 | * | 8/2003 | Drissi et al. .................... 707/3 |
| 2004/0006456 A1 | * | 1/2004 | Loofbourrow et al. ......... 704/4 |
| 2004/0006467 A1 | | 1/2004 | Anisimovich et al. |
| 2004/0044952 A1 | * | 3/2004 | Jiang et al. .................. 715/500 |
| 2005/0060651 A1 | * | 3/2005 | Anderson .................... 715/530 |
| 2005/0108200 A1 | * | 5/2005 | Meik et al. ..................... 707/3 |
| 2005/0108554 A1 | * | 5/2005 | Rubin et al. ................ 713/187 |
| 2006/0041606 A1 | * | 2/2006 | Sawdon ..................... 707/205 |
| 2006/0173839 A1 | * | 8/2006 | Knepper et al. ................ 707/5 |
| 2006/0173886 A1 | * | 8/2006 | Moulinier et al. ........... 707/101 |
| 2006/0294086 A1 | * | 12/2006 | Rose et al. ...................... 707/3 |
| 2007/0083506 A1 | * | 4/2007 | Liddell et al. ................... 707/5 |

(Continued)

FOREIGN PATENT DOCUMENTS

EP      574147 A1 * 12/1993
EP      1844391 B1 * 10/2012

(Continued)

OTHER PUBLICATIONS

Indexing multilingual information on the web, Lap et al., 1998.*

(Continued)

*Primary Examiner* — Augustine K Obisesan
(74) *Attorney, Agent, or Firm* — Farrokh Pourmirzaie; Edell, Shapiro & Finnan, LLC

(57) ABSTRACT

A document to be indexed is initially indexed in dependence upon language-specific rules of a single language. A success metric is used to assess the effectiveness of the single language indexing. If a threshold level of success is not attained, the document is identified as multi-lingual. In response to identifying the document as multi-lingual, the document is queued for multi-lingual indexing. A document may be fragmented into a number of smaller documents, each of which is indexed separately.

20 Claims, 7 Drawing Sheets

(56) References Cited

U.S. PATENT DOCUMENTS

| | | | |
|---|---|---|---|
| 2007/0112761 A1* | 5/2007 | Xu et al. | 707/5 |
| 2007/0299838 A1* | 12/2007 | Behrens et al. | 707/5 |
| 2008/0281804 A1* | 11/2008 | Zhao et al. | 707/5 |
| 2010/0125447 A1* | 5/2010 | Goswami | 704/8 |

FOREIGN PATENT DOCUMENTS

| | | | |
|---|---|---|---|
| JP | 2001067368 A2 | | 3/2001 |
| WO | WO 9704405 | * | 2/1997 |
| WO | WO 2007139610 A1 | * | 12/2007 |
| WO | WO 2009154570 A1 | * | 12/2009 |

OTHER PUBLICATIONS

Language-Dependent and Language-Independent appraoch to cross-lingual text retrival Kamps et al.,, LNCS 3237, pp. 152-165, 2004.*
A Novel Multilingual text categorization system using Latent Semantic indexing, Lee et al, IEEE, 2006.*
Cross-lingual indexing, Steinberger et al , European commission joint research, 2003.*
Linguini: Language Identification for Multilingual Documents, Prager et al.,Proceedings of the 32nd Hawaii International Conference on System Sciences, 1999.*
Automatic Multilingual indexing and natural language processing, Ripplinger et al, 1980.*
Combining multiple strategies for effective monolingual and cross-language retrieval, Information Retrieval, 7, pp. 121-148, 2004.*
Monolingual document retrieval for European languages, Hollink et al, Information Retrieval, 7, pp. 33-52, 2004.*
Interlingual indexing across different languages, Marko et al., Proc. RIAO, pp. 100-115, 2004.*
ISCAS at NTCIR-3: Monolingual, Bilingual and MutiLingual IR, Zhang et al, Proceedings of the Thrid NTCIR Workshop, 2003.*
Automatic Language-Specific Stemming in Information Retrieval, Goldsmith et al, Proceeding of the Workshop of Cross-Language Evaluation Forum on Cross-Language Information Retrieval and Evaluation (CLEF'00), pp. 273-284, 2001.*
Proceeding of Automatic Cross-Language Retrieval Using Latent Semantic Indexing, Dumais et al., AAAI Technical Report SS-97-05, pp. 15-21, 1997.*
Using Latent Semantic Indexing for Multilanguage Information Retrieval, Berry et al, Computers and Humanities, 29, pp. 413-429, 1995.*
Valdez, Alejandro; "Mail Archive: Indexing Documents in Multiple Languages;" Jan. 27, 2009; 1 page; http://mail-archives.apache.org/mod_mbox/lucene-solr-user/200901.mbox/%3Cfb8c73b30901271205n5aa2509dt8a135614d965b555@mail.gmail.com%3E.
"Rosette Language Identifier" 2009; 2 pages; Basis Technology Corporation; Cambridge, Massachusetts, USA; http://www.basistech.com/language-identification/.
Schiel, De Sousa, Ferneda, "SIM—A System for Semi-Automatic Indexing of Mulitlingual Documents;" Sep. 1-3, 1999; 4 pgs (577-581); Database Expert Systems Applications, Proceedings; Tenth International Workshop; IEEE; Florence, Italy.

* cited by examiner

INDEXING DOCUMENTS

BACKGROUND

Access to documents has dramatically increased in the recent past. The number of documents available has made finding documents pertaining to a desired subject matter more difficult. Search and retrieval of these documents is made easier, faster, and more efficient by indexing available documents.

Indexing includes storing data to facilitate the retrieval of appropriate documents. The indexed documents may be parsed or analyzed to obtain this data. Natural language processing or other language-sensitive analysis may extract information from documents that is beneficial to later searches. Because these processes employ language sensitive information, the language of the document being processed must be determined for this analysis.

SUMMARY

Methods, systems, and computer program products for indexing documents are disclosed herein. General embodiments of the present disclosure include a method including indexing a document in dependence upon language-specific rules of a single language; identifying a document as multi-lingual in dependence upon a success metric indicative of effectiveness of the single language indexing; and in response to identifying the document as multi-lingual, queuing the document for multi-lingual indexing. Further embodiments include fragmenting the document into a plurality of smaller documents and separately indexing the smaller documents individually.

Other general embodiments include a system for indexing documents comprising one or more data processing systems. The data processing systems comprise a processor and a computer memory operatively coupled to the processor. The computer memory of one or more of the systems have disposed within it computer program instructions for execution on the processor to implement one or more of the method embodiments described above. More specifically, the computer memory may have disposed within it computer readable program code configured to index a document in dependence upon language-specific rules of a single language; computer readable program code configured to identify a document as multi-lingual in dependence upon a success metric indicative of effectiveness of the single language indexing; and computer readable program code configured to queue the document for multi-lingual indexing in response to identifying the document as multi-lingual.

The foregoing and other objects, features and advantages of the disclosure will be apparent from the following more particular descriptions of example embodiments of the invention as illustrated in the accompanying drawings wherein like reference numbers generally represent like parts of example embodiments of the invention.

DETAILED DESCRIPTION

Figure 1A:
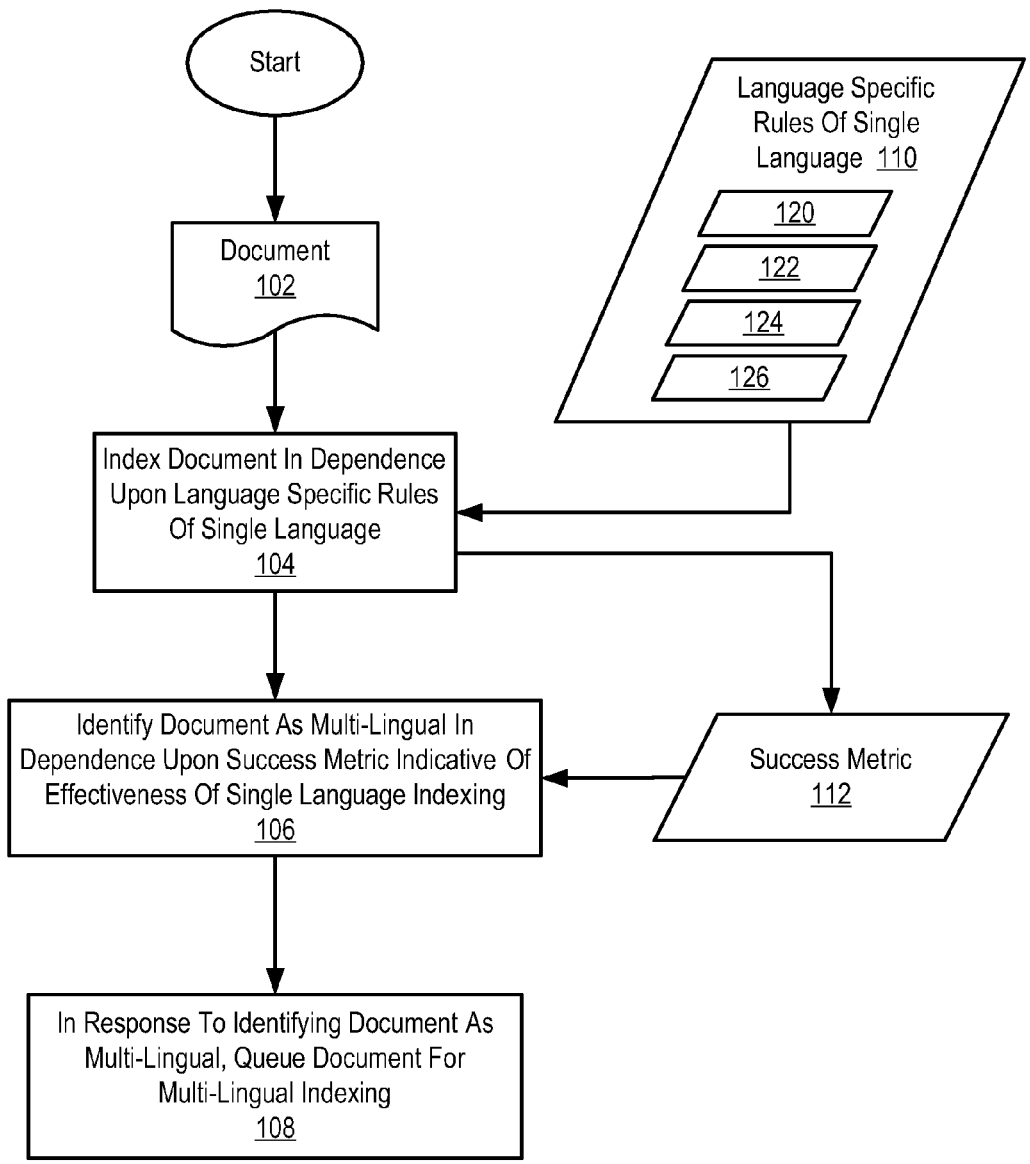
FIGS. 1A-C illustrate methods in accordance with embodiments of the invention.

Examples of methods, systems, and design structures for indexing documents according to embodiments of the present invention are described with reference to the accompanying drawings. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, components, acts, and equivalents of all means or step plus function elements in the claims below are intended to include any structure, material or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
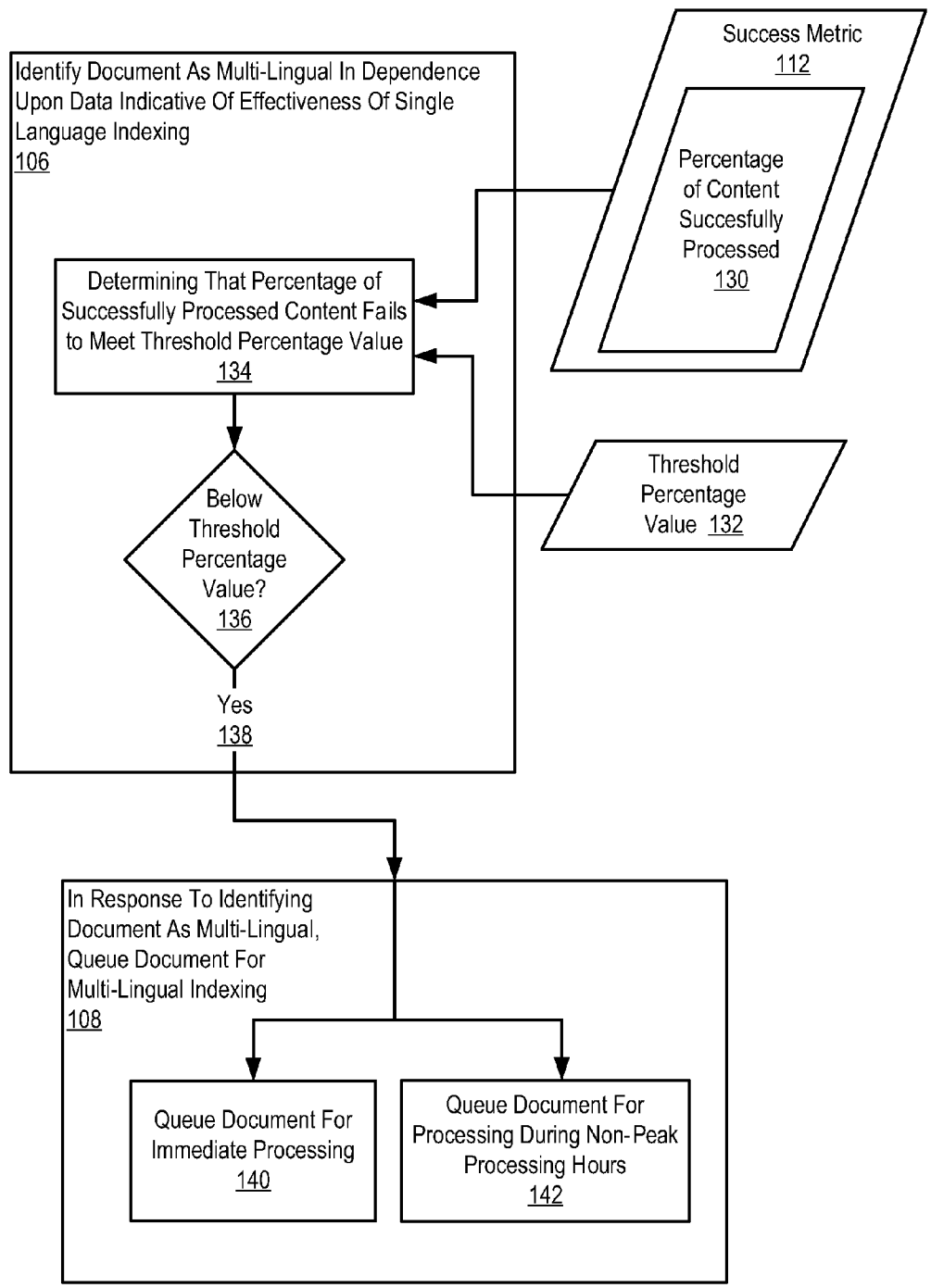

The indexing process includes the language-specific task of converting document text into searchable units of information. FIG. 1A-B illustrate methods for indexing documents in accordance with embodiments of the invention. Referring to FIG. 1A, the method comprises indexing a document 102 in dependence upon language-specific rules 110 of a single language (block 104); identifying the document as multi-lingual in dependence upon a success metric 112 indicative of the effectiveness of the single language indexing (block 106); and in response to identifying the document as multi-lingual, designating the document for multi-lingual indexing (block 108).

A document 102, as used herein, refers to an electronic file available for indexing. A document may be any type of file (such as spreadsheets, charts, presentations, and word processing documents, archives, images, texts, web pages, etc.) in any of hundreds of different file formats available for documents. A document may also be a section or portion of a larger document or file, such as, for example, an original file that is compressed and incorporated in a compressed file, a logical section of a document (a chapter, subheading, etc.) that has been separated from the whole, and so on. For example, one example of a document would be a compressed document archive such as a file in the ZIP file format or TAR file format, which may consist of various compressed documents. Each of the compressed documents could be a single language document of any language or a multi-lingual document combining various languages.

Language-specific rules 110 are rules that employ language sensitive information to improve indexing. Language sensitive information is information which may be extracted from the document 102 in dependence upon a language context. Language sensitive rules 110 may include rules pertaining to stemming 120, part of speech tagging 122, accent-sensitive rules, synonyms 124, stop words 126, or any other language dependent rules as will occur to those of skill in the art.

The language-specific rules 110 are specific to a single language. For example, in one instance, language-specific rules 110 may be comprised of a rule set for English, while in another instance language-specific rules 110 may be comprised of a rule set for French, Spanish, German, Japanese, Kannada, Kashmiri, Urdu, Dogri, simplified Chinese, traditional Chinese, pinyin, Mandarin Chinese, standard Hindi, or any other language as will occur to those of skill in the art. The language may comprise a sub-language or dialect. In some cases, individual rules or rule subsets comprising language-specific rules 110 may be common to (or shared between) separate language-specific rules 110 for different languages.

Success metric 112 indicative of the effectiveness of the single language indexing may be any data (that may be obtained with minimal overhead) which corresponds to the success of the single language indexing. Success metric 112 may be data inherently generated from the single language indexing process. Alternatively, success metric 112 may be generated from the single language indexing process after the addition of tracking or counting code or other programming with a negligible processing footprint. Referring to FIG. 1B, success metric 112 may comprise, for example, a percentage of content 130 (such as, for example, words, paragraphs, sections, pages, and so on) in the document that has been successfully processed during the indexing. Successfully processed content is content for which a token could be successfully generated, or any other measure of successful processing as will occur to those of skill in the art.

Still referring to FIG. 1B, identifying the document as multi-lingual in dependence upon success metric 112 (block 106) may be carried out by determining that the percentage of successfully processed content 130 fails to meet a threshold percentage value 132 (block 134). A running total of successfully processed words may be kept and used to obtain a percentage of successfully processed words. The threshold percentage value 132 may be configured to refine the number of documents marked as multi-lingual. For example, the threshold percentage value 132 may be set at 80%. If the percentage of successfully processed words has failed to exceed the threshold percentage value (138), the method continues at block 108. If the percentage of successfully processed content has exceeded the threshold percentage value, the document is search-ready, and the system does not use further processing resources on the document. For example, if less than 80% of the words are successfully processed, the document is identified as multi-lingual. In other embodiments, additional or alternative statistical measures may be calculated to identify the document as multi-lingual.

Still referring to FIG. 1B, if the percentage of successfully processed words has failed to exceed the threshold percentage value (138), the system queues the document 102 for multi-lingual indexing (block 108). Queuing the document for multi-lingual indexing (block 108) may include storing the document 102 in a separate repository for multi-lingual indexing or sending the document to a separate system or repository. The system may queue the document 102 for immediate processing (block 140), as in the case of a processing load queue. In other embodiments, the document may be queued for indexing at a later time. For example, because multi-lingual indexing is more processing intensive, the document may be queued for multi-lingual indexing during non-peak processing hours (block 142). In some implementations, the queue may be a First-In-First-Out ('FIFO') data structure. In other implementations, the queue may be a Last-In-First-Out ('LIFO') data structure, or the documents in the queue may be dequeued according to priority, using various prioritization systems.

Figure 1C:
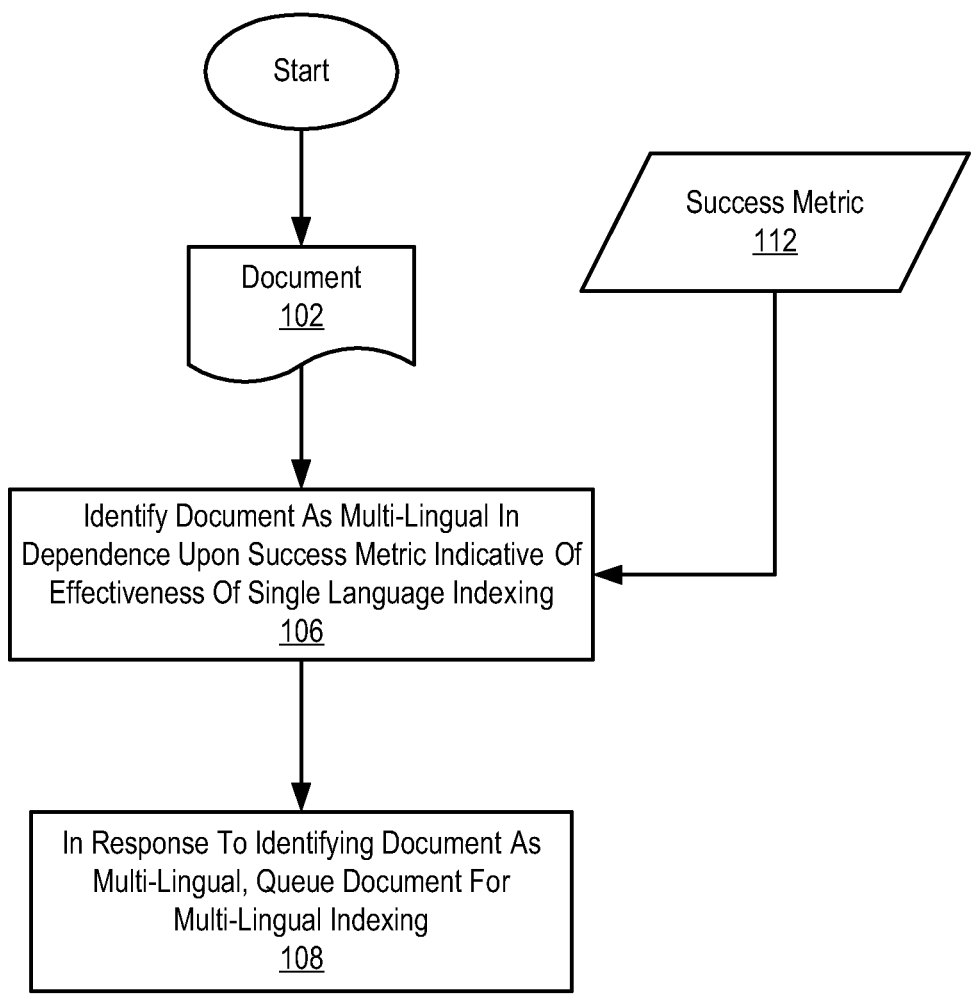

FIG. 1C illustrates a method for indexing documents in accordance with another embodiment of the invention. Referring to FIG. 1C, the method comprises identifying a document 102 as multi-lingual in dependence upon a success metric 112 indicative of the effectiveness of indexing a document according to language-specific rules of a single language (block 106); and in response to identifying the document as multi-lingual, queuing the document 102 for multi-lingual indexing (block 108). The method of FIG. 1C is carried out similarly to FIG. 1A, but forgoes the single language indexing step, which is carried out separately. The method of FIG. 1C is performed after the single language indexing step has been initiated.

Embodiments of the present disclosure include computer-implemented methods described below. In some embodiments, these methods may be carried out entirely on one apparatus or computer of the system. Alternatively, portions of the methods may be carried out on two or more computers connected by a network, such as one or more local area networks ('LANs'), wide area networks ('WANs'), wired or cellular telephone networks, intranets, or the Internet. The order of method elements as described herein does not necessarily limit the order in which the elements can be performed.

Figure 2:
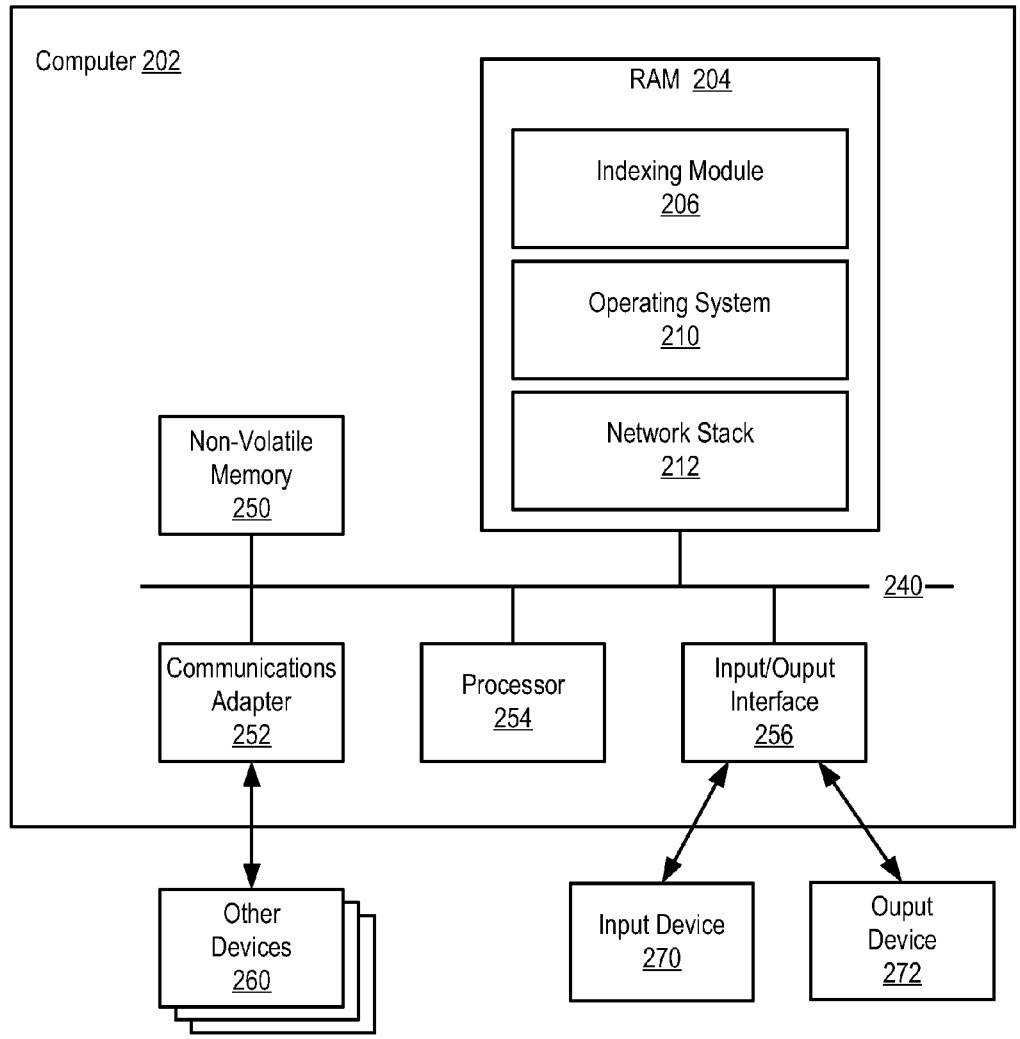
FIG. 2 sets forth a block diagram of a computer for indexing documents in accordance with embodiments of the present disclosure.

FIG. 2 sets forth a block diagram of a computer used in embodiments of the present disclosure. Computer 202 includes at least one computer processor 254 as well as a computer memory, including both volatile random access memory ('RAM') 204 and some form or forms of non-volatile computer memory 250 such as a hard disk drive, an optical disk drive, or an electrically erasable programmable read-only memory space (also known as 'EEPROM' or 'Flash' memory). The computer memory is connected through a system bus 240 to the processor 254 and to other system components. Thus, the software modules are program instructions stored in computer memory.

An operating system 210 is stored in computer memory. Operating system 210 may be any appropriate operating system such as a Windows operating system, Mac OS X, UNIX, LINUX, or AIX from International Business Machines Corporation (Armonk, N.Y.). A network stack 212 is also stored in memory. The network stack 212 is a software implementation of cooperating computer networking protocols to facilitate network communications.

Computer 202 also includes one or more input/output interface adapters 256. Input/output interface adapters 256 may implement user-oriented input/output through software drivers and computer hardware for controlling output to output devices 272 such as computer display screens, as well as user input from input devices 270, such as keyboards and mice.

Computer 202 also includes a communications adapter 252 for implementing data communications with other devices 260. Communications adapter 252 implements the hardware level of data communications through which one computer sends data communications to another computer through a network.

Also stored in computer memory is an indexing module 206. Indexing module 206 comprises computer program instructions for indexing documents according to embodiments of the disclosure. Indexing module 206 may be implemented as one or more sub-modules operating in separate software layers or in the same layer. Although depicted as a separate module from the operating system 210, the indexing module 206 or one or more of the sub-modules may be incorporated as part of the operating system 210. In various embodiments, the indexing module 206 may be implemented in the software stack or in firmware.

The computer 202 disclosed in FIG. 2 is provided for illustration and not for limitation. Embodiments of the invention could be implemented as any viable computing device including logic and memory, or software modules including computer program instructions executed thereon, as will occur to one of ordinary skill in the art, including devices where logic is implemented as field-programmable gate arrays ('FPGAs'), application-specific integrated circuits ('ASICs'), and the like.

Figure 3:
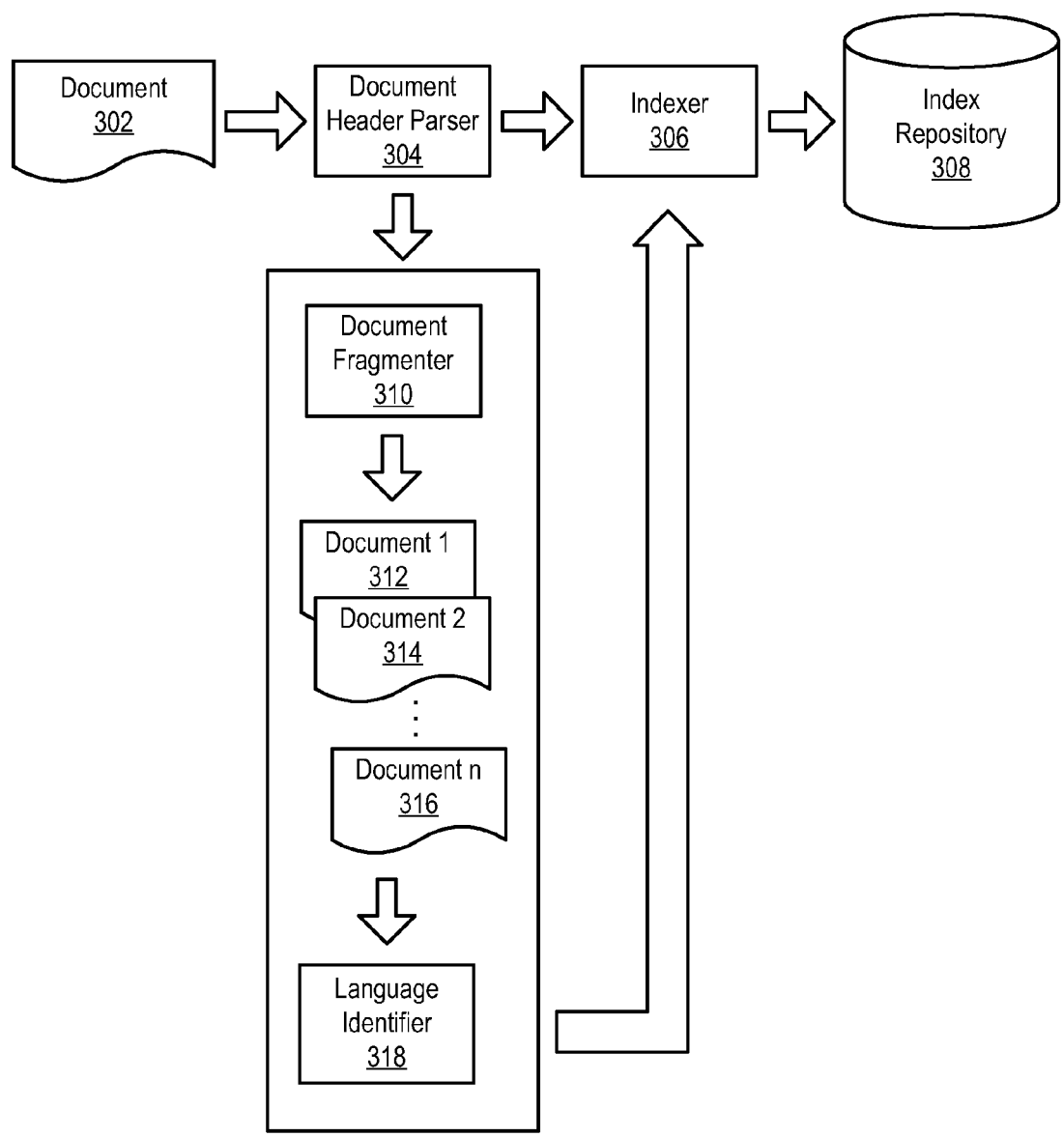
FIG. 3 sets forth a data flow diagram illustrating a software architecture for indexing documents in accordance with embodiments of the present disclosure.

For further explanation, FIG. 3 sets forth a data flow diagram illustrating an example software architecture for indexing documents. The software architecture of FIG. 3 comprises various software modules, including a document header parser 304, a document fragmenter 310, a language identifier 318, an indexer 306, and an index repository 308. The document header parser 304 identifies the file format of document 302 and reads and parses the document header of document 302 accordingly. The document header parser 304 also reads the language-specific information included in the document header, if such language-specific information is present. The document fragmenter 310 divides or breaks the document into different fragments or sections based on information given in the document header for the document fragments. The document fragmenter 310 provides a set of multiple smaller documents 312-316 as output. The language identifier 318 iterates over each of the set of multiple documents 312-316 and identifies the primary language for each of them. The indexer 306 carries out character set encoding, conversions, tokenization and generating indexing information. The indexer 306 also uses language information to build language-sensitive indexing information as per a specific language's rules. The indexer 306 component responsible for tokenization (tokenizer) may be configured to count tokens which were not successfully processed. A count of unsuccessfully processed tokens requires virtually no extra processing power, but may be used to determine the percentage of successfully processed words. The index repository 308 is the repository for the indexing information that may be used for searching. The index repository 308 contains the list of words parsed and pointers to the documents (such as document 302) that contain them. The index repository 308 also contains language-wise index data to support language-aware features.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
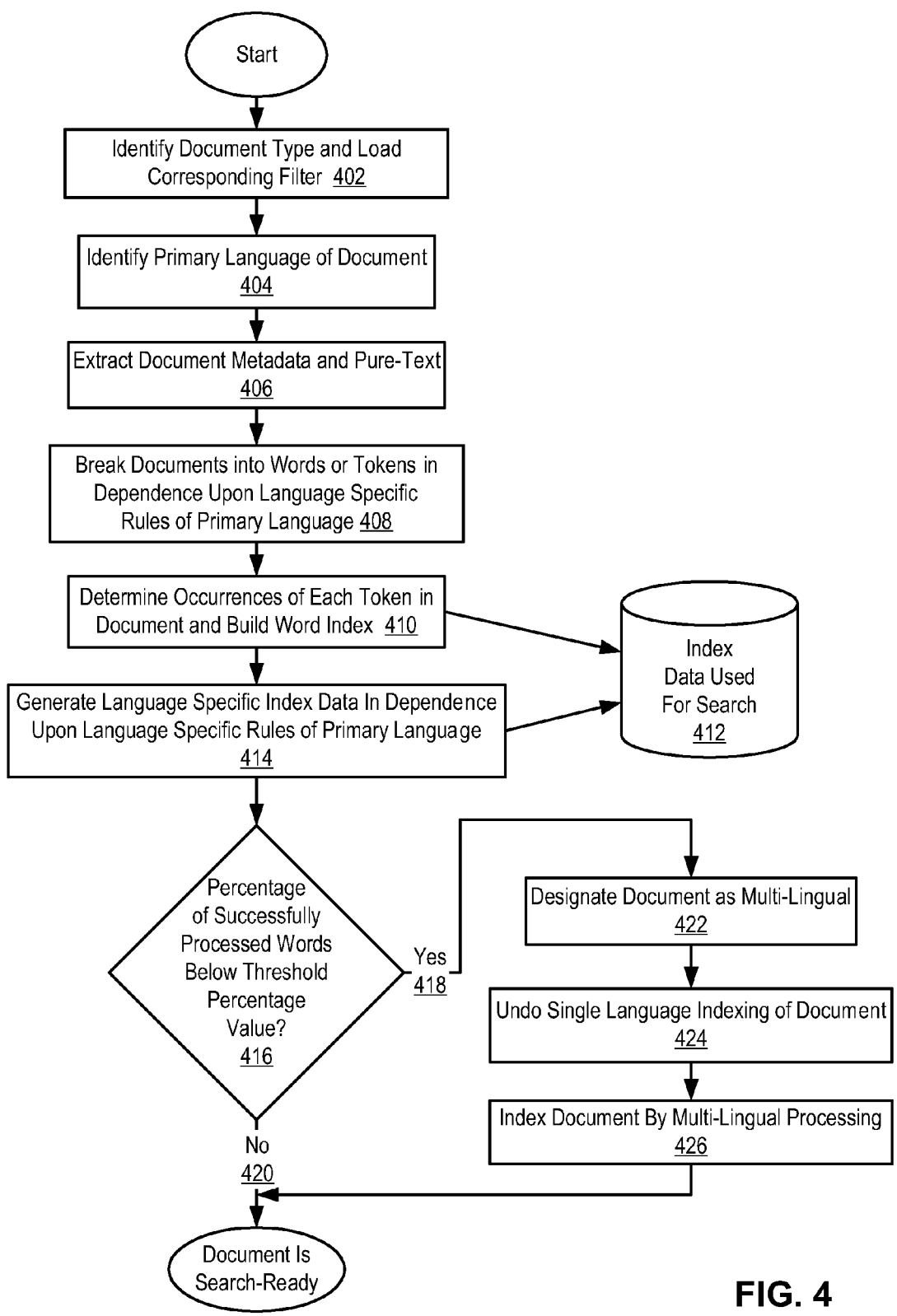
FIG. 4 sets forth a flow chart illustrating a method for indexing documents in accordance with one embodiment of the invention.

For further explanation, FIG. 4 sets forth a flow chart illustrating a method for indexing documents in accordance with one embodiment of the invention. The order of method elements as described herein does not necessarily limit the order in which the elements can be performed. The method begins with a computer system (for example, an indexing server) identifying the document type and loading the corresponding filter (block 402). The document type may include a file format, such as, for example, Microsoft Word Document, Microsoft Excel Document, Hyper Text Markup Language ('HTML'), Portable Document Format ('PDF'), and so on. There are hundreds of different file formats available for indexing, and each of these formats may contain language-related metadata for the text contained in the document. Document formats such as HTML and Extensible Markup Language ('XML') may include a language tag to identify the text language.

After invoking the document filter appropriate for the document type, the system identifies the primary language of the document (block 404). Identifying the document type may be carried out by detecting and parsing the language-related metadata. Although document header standards exist, many documents file formats do not follow these standards and hence do not contain language information. If language related data is unavailable, language identifier 318 may use indexing processes to predict one particular language of a source document. The language identifier may predict the primary language based on a sampling or on a majority of the text. The system may apply the language rules of the primary language to the entire document. For compressed document archives, the language identified for the first document may be considered for all the remaining documents to be indexed. Or for a document, the first n bytes might be sampled to identify the primary language. Once a primary language has been identified, indexing may begin.

The indexing process builds collections, or universal indexes, that store the location of all indexed documents and a list of all words contained within the text of these documents, as well as a stem index. The method of FIG. 4 continues with the indexer 306 extracting document metadata and pure-text (block 406). The indexer breaks documents into words or tokens in dependence upon language-specific rules of the primary language (block 408) and determines occurrences of each token in the document and builds a word index (block 410). As the document is processed, successfully processed document content (or, conversely, unsuccessfully processed document content) is tracked. The word index may be stored in a repository containing index data used for search 412. The indexer 306 generates language-specific index data in dependence upon language-specific rules of the primary language (block 414). This index data may be stored in repository 412.

The method includes determining whether a percentage of successfully processed words falls below a threshold percentage value (block 416). The threshold percentage value is a configurable value representing a minimum or nominal percentage of words that may be processed when indexing according to specific language rules of the appropriate language. If the percentage of successfully processed words has exceeded the threshold percentage value (420), the document is search-ready, and they system does not use further processing resources on the document. If the percentage of successfully processed words has failed to exceed the threshold percentage value (418), the system designates the document as multi-lingual (block 422). Further, the system may undo (i.e., reverse or negate) the single language indexing (block 424) and index the document by multi-lingual processing (block 426). Undoing the single language indexing may be carried out by removing the word index and the language-specific index data from the repository 412.

Figure 5:
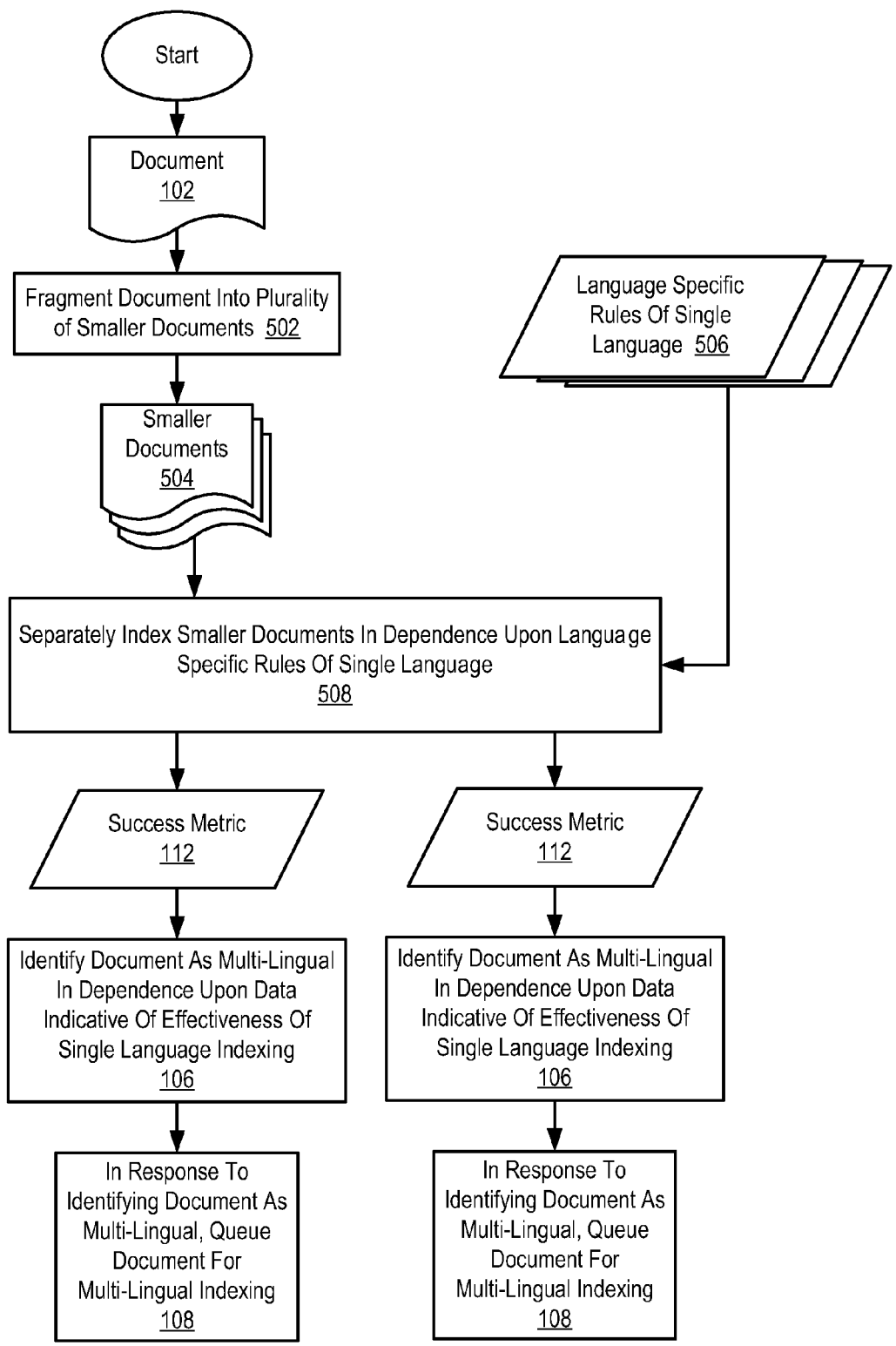
FIG. 5 sets forth a data flow diagram illustrating a method for indexing documents in accordance with embodiments of the invention.

FIG. 5 sets forth a data flow diagram illustrating a method for indexing documents in accordance with one embodiment of the invention. The method of FIG. 5 is carried out similarly to FIG. 1A, but further includes fragmenting the document 102 into a plurality of smaller documents 504 (block 502). After fragmentation, an indexer separately indexes each of the smaller documents 504 in dependence upon language-specific rules of a single language 506 for that document (block 508). The system then continues by identifying a document 102 as multi-lingual in dependence upon a success metric 112 indicative of the effectiveness of indexing a document according to language-specific rules of a single language (block 106); and in response to identifying the document as multi-lingual, queuing the document 102 for multi-lingual indexing (block 108), as described in detail above.

It should be understood that the inventive concepts disclosed herein are capable of many modifications. Such modifications may include various methods, systems, and programs for tokenization, stemming, language recognition, queuing, and so on. To the extent such modifications fall within the scope of the appended claims and their equivalents, they are intended to be covered by this patent.

What is claimed is:

1. A computer-implemented method for indexing documents comprising:
    indexing a document written in one or more natural languages, wherein the indexing includes:
        applying language-specific rules of one of the one or more natural languages to content of the document; and
        generating a number of tokens from the content of the document that comply with the language-specific rules;
    determining a success metric based on the generated number of tokens that complied with the language-specific rules;
    comparing the success metric to a threshold value, wherein the threshold value indicates a predetermined amount of content in the document designating a multi-lingual document;
    identifying the document as a multi-lingual document based upon the comparing; and
    in response to identifying the document as a multi-lingual document, queuing the document for multi-lingual indexing.

2. The method of claim 1 further comprising fragmenting the document into a plurality of smaller documents and separately indexing the smaller documents individually.

3. The method of claim 1 wherein the success metric comprises a percentage of content in the document.

4. The method of claim 1 wherein the language-specific rules comprise rules selected from one of the group of stemming rules, part of speech tagging rules, accent-sensitive rules, synonym rules, and stop word rules.

5. The method of claim 1 wherein the queuing the document for multi-lingual indexing comprises queuing the document for immediate processing.

6. The method of claim 1 wherein the queuing the document for multi-lingual indexing comprises queuing the document for processing during non-peak processing hours.

7. The method of claim 1 further comprising reversing the indexing of the document in response to identifying the document as a multi-lingual document.

8. A computer program product for indexing documents, the computer program product comprising a computer readable memory device having computer readable program code stored therein, the computer readable program code comprising:
   computer readable program code configured to index a document written in one or more natural languages, wherein indexing includes:
      applying language-specific rules of one of the one or more natural languages to content of the document; and
      generating a number of tokens from the content of the document that comply with the language-specific rules;
   computer readable program code configured to determine a success metric based on the generated number of tokens that complied with the language-specific rules;
   computer readable program code configured to compare the success metric to a threshold value, wherein the threshold value indicates a predetermined amount of content in the document designating a multi-lingual document;
   computer readable program code configured to identify the document as a multi-lingual document based upon the comparing; and
   computer readable program code configured to queue the document for multi-lingual indexing in response to identifying the document as a multi-lingual document.

9. The computer program product of claim 8 further comprising computer readable program code configured to fragment the document into a plurality of smaller documents and separately index the smaller documents individually.

10. The computer program product of claim 8 wherein the success metric comprises a percentage of content in the document.

11. The computer program product of claim 8 wherein the language-specific rules comprise rules selected from one of the group of stemming rules, part of speech tagging rules, accent-sensitive rules, synonym rules, and stop word rules.

12. The computer program product of claim 8 wherein the computer readable program code configured to queue the document for multi-lingual indexing comprises computer readable program code configured to queue the document for immediate processing.

13. The computer program product of claim 8 wherein the computer readable program code configured to queue the document for multi-lingual indexing comprises computer readable program code configured to queue the document for processing during non-peak processing hours.

14. The computer program product of claim 8 further comprising computer readable program code configured to reverse the indexing of the document in response to identifying the document as a multi-lingual document.

15. A system for indexing documents comprising:
   a processor; and
   a computer memory operatively coupled to the processor, the computer memory including:
      computer readable program code configured to index a document written in one or more natural languages, wherein indexing includes:
         applying language-specific rules of one of the one or more natural languages to content of the document; and
         generating a number of tokens from the content of the document that comply with the language-specific rules;
      computer readable program code configured to determine a success metric based on the generated number of tokens that complied with the language-specific rules;
      computer readable program code configured to compare the success metric to a threshold value, wherein the threshold value indicates a predetermined amount of content in the document designating a multi-lingual document;
      computer readable program code configured to identify the document as a multi-lingual document based upon the comparing; and
      computer readable program code configured to queue the document for multi-lingual indexing in response to identifying the document as a multi-lingual document.

16. The system of claim 15 wherein the computer memory further includes computer readable program code configured to fragment the document into a plurality of smaller documents and separately index the smaller documents individually.

17. The system of claim 15 wherein the language-specific rules comprise rules selected from one of the group of stemming rules, part of speech tagging rules, accent-sensitive rules, synonym rules, and stop word rules.

18. The system of claim 15 wherein the computer readable program code configured to queue the document for multi-lingual indexing comprises computer readable program code configured to queue the document for immediate processing.

19. The system of claim 15 wherein the computer readable program code configured to queue the document for multi-lingual indexing comprises computer readable program code configured to queue the document for processing during non-peak processing hours.

20. The system of claim 15 wherein the computer memory further includes computer readable program code configured to reverse the indexing of the document in response to identifying the document as a multi-lingual document.

* * * * *